US007035287B2

(12) United States Patent
Tourunen et al.

(10) Patent No.: US 7,035,287 B2
(45) Date of Patent: Apr. 25, 2006

(54) DEFINING HEADER FIELD COMPRESSION FOR DATA PACKET CONNECTION

(75) Inventors: Ari Tourunen, Espoo (FI); Juha Kalliokulju, Vesilahti (FI)

(73) Assignee: Nokia Mobile Phones, Ltd., Espoo (FI)

(*) Notice: Subject to any disclaimer, the term of this patent is extended or adjusted under 35 U.S.C. 154(b) by 943 days.

(21) Appl. No.: 09/978,479

(22) Filed: Oct. 16, 2001

(65) Prior Publication Data
US 2002/0097723 A1 Jul. 25, 2002

(30) Foreign Application Priority Data
Oct. 18, 2000 (FI) .................................. 20002307

(51) Int. Cl.
*H04J 3/18* (2006.01)
(52) U.S. Cl. .................... 370/477; 370/389; 370/392; 370/471
(58) Field of Classification Search ................ 370/349, 370/389, 392, 401, 471, 477, 521
See application file for complete search history.

(56) References Cited

U.S. PATENT DOCUMENTS

| | | | |
|---|---|---|---|
| 6,700,888 B1 * | 3/2004 | Jonsson et al. | 370/392 |
| 6,754,231 B1 * | 6/2004 | Jonsson et al. | 370/474 |
| 6,791,982 B1 * | 9/2004 | Westberg | 370/392 |
| 6,839,339 B1 * | 1/2005 | Chuah | 370/349 |
| 6,859,442 B1 * | 2/2005 | Agarwal et al. | 370/316 |

FOREIGN PATENT DOCUMENTS

| | | |
|---|---|---|
| EP | 1081910 A2 | 3/2001 |
| WO | WO 00/49748 | 8/2000 |
| WO | WO 00/52884 | 9/2000 |
| WO | WO 01/65804 A1 | 9/2001 |

OTHER PUBLICATIONS

"MPLS/IP Header Compression", draft-ietf-mpls-hdr-comp-00.txt, Berger et al., 2000, chapter 3.1, 11 page document.
"[roch] keyword-draft cutouts (with attachment?)", Burmeister, 2000, chapter 5.7.2.1.2, 14 page document.
3GPP TR 25.844 v2.0.0 (Mar. 2001), 3rd Generation Partnership Project; Technical Specification Group Radio Access Network; Radio Access Bearer Support Enhancements (Release 4).
Internet Draft—"Robust Header Compression (ROHC)", Burmeister et al., Ver. 04, Oct. 11, 2000.

* cited by examiner

*Primary Examiner*—Chi Pham
*Assistant Examiner*—Rhonda Murphy
(74) *Attorney, Agent, or Firm*—Perman & Green, LLP.

(57) ABSTRACT

A method of defining header field compression for a data packet connection and a header field compression system, in which a context for controlling the operation of a compressor and decompressor is defined as one parameter of the connection. A length is defined for a context identifier used in identifying data packet connections for data transmission between the compressor and decompressor, said length defining the maximum number of data packet connections transmitted on one connection. Each data packet connection is identified by its own context identifier. The parameters of the connection are defined in such a manner that at least the number of header fields of data packet connections allowed by the defined context identifier length can be compressed despite the fact that the number of data packet connections allowed by said context identifier length is exceeded.

15 Claims, 4 Drawing Sheets

| PID value | Optimisation method | Packet type |
|---|---|---|
| 0 | No header compression | - |
| 1 | RFC2507 | Full header |
| 2 | RFC2507 | Compressed TCP |
| 3 | RFC2507 | Compressed TCP nondelta |
| 4 | RFC2507 | Compressed non-TCP |
| 5 | RFC2507 | |
| 6 | ROHC | CID length 0 bytes |
| 7 | ROHC | CID length 1 bytes |
| 8 | ROHC | CID length 2 bytes |
| 9 | ... | ... |
| ... | Unassigned value | - |

FIG. 6

DEFINING HEADER FIELD COMPRESSION FOR DATA PACKET CONNECTION

BACKGROUND OF THE INVENTION

The invention relates to defining header field compression for a data packet connection, especially when applying compression to mobile systems.

The rapid progress in IP (Internet Protocol) technology during the last few years has also expanded the potential of using different IP-based applications outside the conventional Internet data transfer. IP-based telephony applications in particular have developed at a fast pace, as a result of which an ever expanding part of the call transmission path even in conventional telephone networks (PSTN/ISDN, Public Switched Telephone Network/Integrated Services Digital Network) and mobile networks (PLMN, Public Land Mobile Network) can, in principle, be implemented by utilising IP technology.

Especially in mobile networks, IP technology offers many advantages, since in addition to the conventional voice services of mobile networks, which could be provided by means of various IP voice applications, mobile networks will provide more and more different data services, such as Internet browsing, e-mail services, games, etc., which are typically most preferably implemented as packet-switched IP-based services. This way, IP layers arranged in mobile system protocols could serve both audio/video services and various data services.

In mobile networks, it is especially important to utilise the limited radio resources as efficiently as possible. This, for its part, complicates the utilisation of the IP protocols in the radio interface, because in IP-based protocols, the proportion of various header fields of the transferred data is very large, and correspondingly, the proportion of payload is small. In addition, the bit error rate (BER) of the radio interface and the combined round-trip time (RTT) of the uplink and downlink directions may in bad conditions increase a great deal, which causes problems in most known header field compression methods. This has created a need to develop a header field compression method suitable for different IP protocols, which would be especially suited for data transfer over the radio interface: efficient header field compression which can, however, be used in conditions in which bit error rates and round-trip times increase a great deal.

For this purpose, IETF (Internet Engineering Task Force) has lately been working on the standardisation of a header field compression method known as ROHC (Robust Header Compression). One idea behind the development of ROHC is that there is a great deal of redundancy between the several IP header fields used in data packet transfer, not only inside the data packets, but also between them. In other words, a large amount of the information in the header fields does not change at all during the transfer of the data packets and is thus easy to reconstruct even though it is not transmitted. Only a small part of the header fields are such that the information they comprise requires attention during compression. Further, ROHC comprises several compression levels, whereby the efficiency of the compression increases when transition to a higher level takes place. ROHC always tries to use the most efficient compression possible, in such a manner, however, that before transition to the next level, a sufficient reliability of operation of the level is always ensured. ROHC also has the typical characteristic that it leaves several matters essential for the use of a compression method to be handled by the lower link layer.

One such matter to be negotiated through the lower link layer between a sender and a receiver, i.e. compressor and decompressor, is the definition of the length of a context identifier (CID) used on a certain radio link. The context identifier CID is used to distinguish from each other several packet data flows transmitted on the same radio link. The length of the context identifier CID can be a large value or a small value, whereby with a large value, the length of the context identifier is 1 or 2 bytes (8 or 16 bits) and with a small value, it is 0 bytes (0 bits). With a small CID length (0 bytes), it is thus not possible to distinguish several simultaneous data flows from each other by means of the context identifier CID, but ROHC comprises, however, an internal mechanism, by means of which a maximum of 16 simultaneous data flows can be distinguished from each other, even though the length of the context identifier field was defined at zero bytes. The length of CID is thus negotiated before the compression of the data to be transmitted is started, and the negotiated length of the context identifier CID is used thereafter in both the uplink and downlink direction.

One problem in the arrangement described above is, for instance, a situation in which a maximum number of simultaneous data connections allowed by the defined context identifier length is transmitted on a radio bearer, and the user of the terminal wants to form one more simultaneous data flow. Because a maximum number of context identifiers is already in use, a context identifier cannot be defined for the new data flow. Then, if the new data flow needs to be transmitted compressed, a data flow context already in use will be defined for it. This means that two compressed data connections having the same context identifier are established, which the decompressor is unable to distinguish from each other, and an error situation arises in the entire compression system. Because the current practices of ROHC do not define the action to be taken on a new "extra" data flow, the problem described above occurs always when a radio bearer uses the maximum number of data connections allowed by the context identifier CID and the user of the terminal tries to open a new data flow. Further, a terminal used in some situations, for instance when applying ROHC to mobile systems, may set its own internal limitations due to memory space, for instance, on simultaneous data connections, and these limitations may be stricter than what ROHC would require.

BRIEF DESCRIPTION OF THE INVENTION

It is thus an object of the invention to develop a method and an apparatus implementing the method so as to reduce the above-mentioned drawbacks. The object of the invention is achieved by a method and system, which are characterized by what is stated in the independent claims. Preferred embodiments of the invention are set forth in the dependent claims.

The invention is based on the idea that despite exceeding the number of data packet connections allowed by the context identifier length, the radio bearer parameters are defined in such a manner that at least the number of data packet connection header fields allowed by the defined context identifier length can be compressed. According to a preferred embodiment of the invention, this can be implemented by allocating at least one value from the length of the defined context identifier for an uncompressed data flow. According to a second preferred embodiment of the invention, in which compression is controlled by the convergence protocol layer of the mobile system, the mobile system is directed to re-define the radio bearer parameters in such a manner that the new value of the context identifier length enables the compression of the header fields of all data packet connections, if the number of data packet connections allowed by the original context identifier length is exceeded. According to a further preferred embodiment of the invention, in response to exceeding the number of data packet connections allowed by the maximum value of the context identifier length, the convergence protocol layer is directed to define for the data packet connections several link-level connections, to which the data packet connections are allocated.

The method and system of the invention provide the advantage that at least as many data connections being transmitted on the radio bearer as allowed by the length of the context identifier field at its maximum can in all situations be compressed. Further, the procedure of the invention provides the advantage that discontinuation of compression for the data connections that are transmitted compressed is avoided. A yet further advantage of the invention is that it enables applying header field compression to data connections in the most efficient manner possible, which is advantageous for the efficient utilisation of radio resources.

BRIEF DESCRIPTION OF THE FIGURES

In the following, the invention will be described in greater detail by means of preferred embodiments and with reference to the appended drawings in which FIG. 6 shows defining data packet identifiers according to an embodiment of the invention.

DETAILED DESCRIPTION OF THE INVENTION

In the following, the implementation of the header field compression method ROHC in question is described for the parts essential for the invention. For a more detailed description of the compression method in question, reference is made to a yet unfinished Internet draft "Robust Header Compression (ROHC)", version 04, 11 Oct. 2000.

In different compression methods, a context is typically defined for both a compressor and a decompressor, the context being a state which the compressor uses to compress a header field to be transmitted and the decompressor uses to decompress a received header field. Typically, the context comprises an uncompressed version of the previous header field transmitted (compressor) or received (decompressor) over a data transfer connection. In addition, the context can comprise information identifying a data packet flow, such as sequence numbers or time stamps of data packets. Thus, the context typically comprises both static information, which remains the same for the entire data packet flow, and dynamic information, which changes during the data packet flow, but often does it according to a defined pattern.

ROHC uses three compression levels in such a manner that the compression is started on the lowest level and continues gradually to the higher levels. The basic principle is that compression is always performed on the highest possible level, in such a manner, however, that the compressor has sufficient certainty of the fact that the decompressor has enough information to perform decompression on the level in question. Factors affecting the move between different compression levels are variation in consecutive header fields, positive and negative acknowledgements received from the decompressor, and when there are no acknowledgements, the expiration of specific sequential counters. It is possible to move correspondingly to a lower level from a higher compression level.

Figure 1:
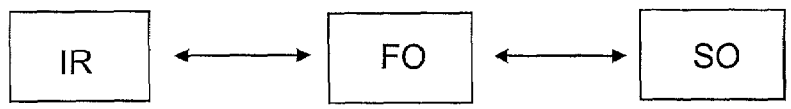
FIG. 1 is a block diagram of transitions between different compression levels of ROHC.

The compression levels ROHC uses in connection with IP (Internet Protocol), UDP (User Datagram Protocol) and RTP (Real-Time Protocol) protocols are initiation/refresh (IR), first order (FO), and second order (SO), and transitions between these levels are described in the diagram of FIG. 1. The IR level is used to create the context for the decompressor or to recover from an error situation. The compressor moves to the IR level when header field compression is started, requested by the decompressor, or when an update timer expires. On the IR level, the compressor sends IR header fields in an uncompressed format. The compressor tries to move to a higher level when it is certain that the decompressor has received the update information.

The FO level is used to inform the recipient of irregularities in the header fields of the data packet flow. After the IR level, the compressor operates on the FO level in a situation where the header fields do not form a uniform pattern (in other words, consecutive header fields change randomly in such a manner that the changes cannot be predicted) or the compressor cannot be certain that the decompressor has received the parameters defining the uniform pattern of the header fields. This is a typical situation when transmitting speech, for instance, is started, especially during the first speech bursts. On the FO level, the compressor sends compressed FO header fields. The compressor again tries to move to a higher level if the header fields form a uniform pattern and it is certain that the decompressor has received the parameters defining the uniform pattern. The FO-level data packets comprise typically context update information, which means that a successful decompression also requires a successful transmission of consecutive FO header fields. Thus, the success of the decompression process is sensitive to lost or damaged FO-level packets.

On the SO level, compression is optimal. The header fields form a uniform pattern which the compressor depicts with compressed SO header fields which, in practice, are sequence numbers of the data packets. Information is transmitted already on the FO level to the decompressor on parameters defining the uniform pattern of the header fields, and on the basis of the parameters and the received sequence number, the decompressor can extrapolate the original header fields. Because the data packets sent on the SO level are, in practice, independent of each other, the error sensitivity of decompression is also low. When the header fields no longer form a uniform pattern, the compressor moves back to the FO level.

Decompression also has three levels which are bound to the context definition of the decompressor. The decompressor always starts its operation from the lowest level when no context has yet been defined (No Context). The decompressor has then not yet decompressed any data packets. When the decompressor has decompressed the first data packet which comprises both static and dynamic context information, it can move over the middle level (Static Context) straight to the top level (Full Context). As a result of several error situations on the top level, the decompressor moves to the middle level, but typically even one successfully decompressed data packet returns the decompressor to the top level.

Figure 2:
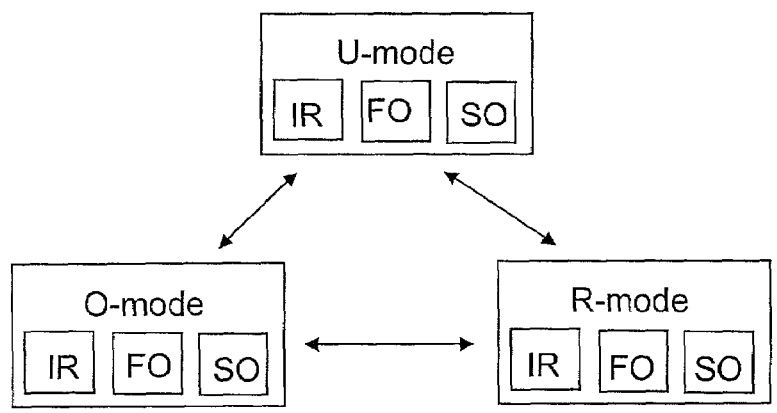
FIG. 2 is a block diagram of transitions between different operational modes of ROHC.

In addition to different compression levels, ROHC has three different operational modes: unidirectional mode (U mode), bi-directional optimistic mode (O mode), and bi-directional reliable mode (R mode), which are shown in the diagram of FIG. 2. According to FIG. 2, each compression level (IR, FO, SO) described above functions in each mode, but each mode functions in its own way on each level and also makes decisions on transitions between levels in its own way. The selection of the mode for each compression situation depends on the parameters of the used data transfer connection, such as the possibility to use a return channel, error probabilities and distribution, effects of variation in the size of the header fields.

In the unidirectional mode, data packets are transmitted from compressor to decompressor only, so the U mode of ROHC is useful in situations where the use of a return channel is not possible or desirable. In the U mode, transitions between different compression levels are made as a result of the expiration of certain sequential counters or on the basis of variation in the header field patterns. Because no return channel is used, compression in the U mode is less efficient and the disappearance of data packets on the transmission path more probable than in either of the bi-directional modes. Using ROHC is always started in the U mode and transition to either of the bi-directional modes can take place when the decompressor has received at least one packet and as a response to the packet, the decompressor indicates that a mode change is necessary.

The bi-directional optimistic mode is similar to the unidirectional mode with the exception that in the O mode, a return channel is used to correct error situations and to acknowledge significant context updates from the decompressor to the compressor. Sequential updates are not made in the O mode. The O mode is preferably suited for connections which require optimal compression efficiency with a small return channel traffic. The O mode provides a reasonably reliable data packet transfer, in which the synchronisation between the compressor and decompressor can typically be maintained well and data packets are seldom lost and if they are, in negligible numbers. At very high bit error rates, data packets can, however, be lost on the transmission path.

The bi-directional reliable mode differs clearly from the above-mentioned modes. The R mode uses a return channel to acknowledge all context updates, also to acknowledge sequence number updates. Thus in the R mode, data packets can nearly entirely reliably be transmitted between the compressor and decompressor. Compressing header fields cannot cause the disappearance of data packets in the R mode. A drawback of the R mode is that the size of the header field is in some cases slightly larger than in the above-mentioned modes and that the return channel traffic increases considerably.

The three operational modes and three compression levels of ROHC form different operating situations for the compression of the header fields, each situation requiring the definition of the operation of the compressor and decompressor and the transmission of packets between them. ROHC uses different packets in different operating situations. At the moment, six different data packet types are defined for ROHC, four of which are used for transmission from the compressor to the decompressor and two as return channel data packets from the decompressor to the compressor. The number of used data packet types may change in the future, but all data packet types are characterized in that a context identifier CID defining the context used at each time is attached to each data packet before sending the packet to the transmission path.

The length of the context identifier CID is negotiated separately for each radio bearer by the compressor and decompressor. According to the ROHC definitions, the lower protocol layer (link layer) used at each time must provide a mechanism for the negotiation of the parameters, such as the length of the context identifier, used in header field compression. The parameters are negotiated before starting the compression and, in this connection, the length of the context identifier of the data packet flow can, according to prior art, be defined to be 0, 8 or 16 bits. On one logical data transfer channel, it is possible to transmit simultaneously several data packet flows whose contexts are identified and distinguished from each other by means of the context identifier CID. If only one data packet flow is transmitted on the channel, which is typical of different VoIP applications (Voice over IP), for instance, the length of the context identifier CID is made "small", i.e. given the value 0. However, even at this time it is possible by means of internal ROHC mechanisms to distinguish a maximum of 16 simultaneous data flows from each other, i.e. 15 new data connections can always be opened in addition to the original data flow, even though the length of the context identifier CID was defined to zero. This is implemented in such a manner that the first data connection is always transmitted without any context identifier and to the following data connections, one byte is attached, whose first four bits indicate that this is a context identifier and the following four bits indicate the actual context identifier value. If, when defining the radio bearer, it is obvious that several data packet flows will be transmitted on the same channel, a large value, i.e. either 1 or 2 bytes (8 or 16 bits), is preferably defined as the length of the context identifier depending on the application, data transmission protocol and channel conditions used on the radio bearer.

One telecommunications system, to which the header field compression method according to the ROHC specifications is to be applied, is a third-generation mobile system, also known as UMTS (Universal Mobile Telecommunication System) and IMT-2000 (International Mobile Telephone System). In the following, the structure of the UMTS system is described in a simplified manner on the basis of FIG. 3.

Figure 3:
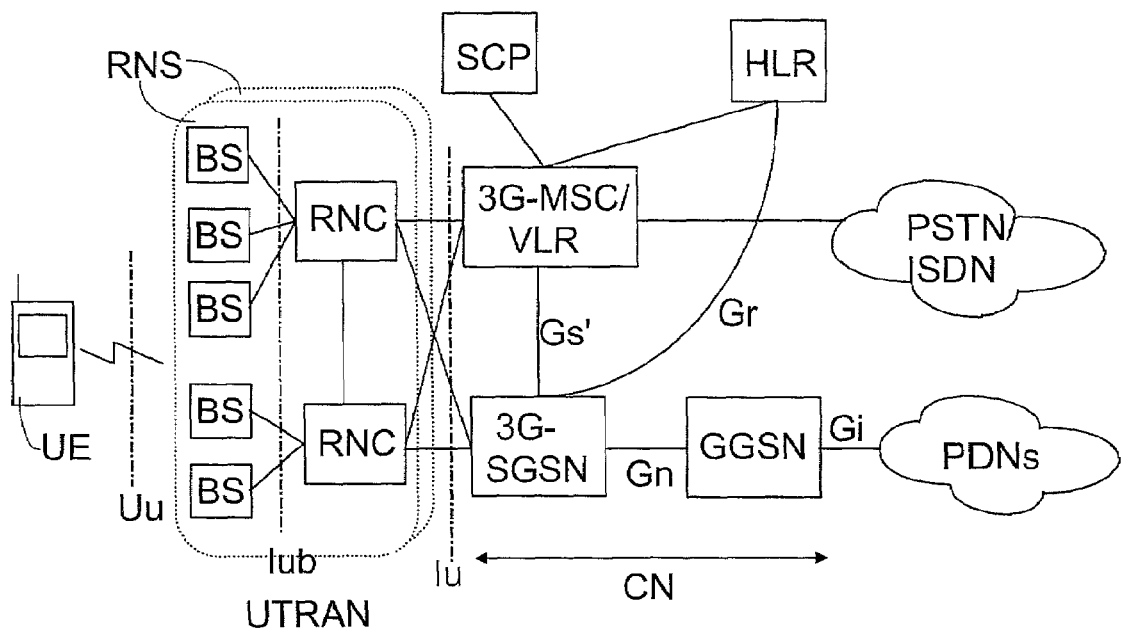
FIG. 3 is a block diagram of a simplified structure of the UMTS system.

FIG. 3 only contains the blocks essential for explaining the invention, but it is obvious to a person skilled in the art that a conventional mobile telephone system also comprises other functions and structures, which need not be described in greater detail herein. The main parts of a mobile telephone system are a core network CN, a UMTS mobile telephone system terrestrial radio access network UTRAN, which form the fixed network of the mobile telephone system, and a mobile station or user equipment UE. The interface between CN and UTRAN is referred to as Iu and the air interface between UTRAN and UE is referred to as Uu.

UTRAN typically comprises several radio network subsystems RNS, the interface between the RNSs being referred to as Iur (not shown). RNS comprises a radio network controller RNC and one or more base stations BS, also referred to as nodes B. The interface between RNC and BS is referred to as Iub. The base station BS typically takes care of radio path implementation and the radio network controller RNC manages at least the following: management of radio resources, control of handover between cells, power adjustment, timing and synchronization, paging the subscriber terminal.

The core network CN is made up of an infrastructure belonging to a mobile telephone system and external to UTRAN. In the core network, a mobile switching center/visitor location register 3G-MSC/VLR is connected to a home location register HLR and preferably also to a service control point SCP of an intelligent network. The home location register HLR and the visitor location register VLR comprise information on mobile subscribers. the home location register HLR comprises information on all subscribers in a mobile network and the services they subscribe to, and the visitor location register VLR comprises information on mobile stations visiting the area of a certain mobile switching center MSC. A connection to a serving node of a packet radio system 3G-SGSN (Serving GPRS Support Node) is formed through an interface Gs' and to a fixed telephone network PSTN/ISDN through a gateway mobile switching center GMSC (not shown). A connection from the serving node 3G-SGSN to external data networks PDN is formed through an interface Gn to a gateway node GGSN (Gateway GPRS Support Node) which has a further connection to the external data networks PDN. The connection from both the mobile switching center 3G-MSC/VLR and the serving node 3G-SGSN to the radio network UTRAN (UMTS Terrestrial Radio Access Network) is set up through the interface Iu. It should be noted that the UMTS system is designed in such a manner that the core network CN can be identical to the core network of a GSM system, for instance, in which case there is no need to rebuild the entire network infrastructure.

The UMTS system also comprises a packet radio system which is to a large extent implemented according to a GPRS system connected to a GSM network, which explains the references to a GPRS system in the names of the network elements. The UMTS packet radio system can comprise several gateway and serving nodes, and several serving nodes 3G-SGSN are typically connected to one gateway node 3G-GGSN. Both nodes 3G-SGSN and 3G-GGSN function as routers supporting the mobility of a mobile station, which routers control the mobile system and route data packets to mobile stations regardless of their location and the used protocol. The serving node 3G-SGSN is in contact with a mobile station UE through the radio network UTRAN. A task of the serving node 3G-SGSN is to detect mobile stations capable of packet radio connections in its service area, to transmit and receive data packets from said mobile stations and to track the location of the mobile stations in its service area. Further, the serving node 3G-SGSN is in contact with the mobile switching center 3G-MSC and the visitor location register VLR through the signalling interface Gs' and with the home location register HLR through the interface Gr. Records related to packet radio services and comprising subscriber-specific packet data protocol contents are also stored in the home location register HLR The gateway node 3G-GGSN acts as a gateway between the UMTS network packet radio system and the external data network PDN (Packet Data Network). External data networks include the UMTS or GPRS network of a second network operator, the Internet, an X.25 network or a private local area network. The gateway node 3G-GGSN is in contact with said data networks through the interface Gi. Data packets being transmitted between the gateway node 3G-GGSN and the serving node 3G-SGSN are always encapsulated according to the gateway tunnelling protocol GTP. The gateway node 3G-GGSN also contains PDP (Packet Data Protocol) addresses of the mobile stations and routing information, i.e. 3G-SGSN addresses. The routing information is thus used to link the data packets between the external data network and the serving node 3G-SGSN. The network between the gateway node 3G-GGSN and the serving node 3G-SGSN employs an IP protocol, preferably the IPv6 (Internet Protocol, version 6).

Figure 4A:
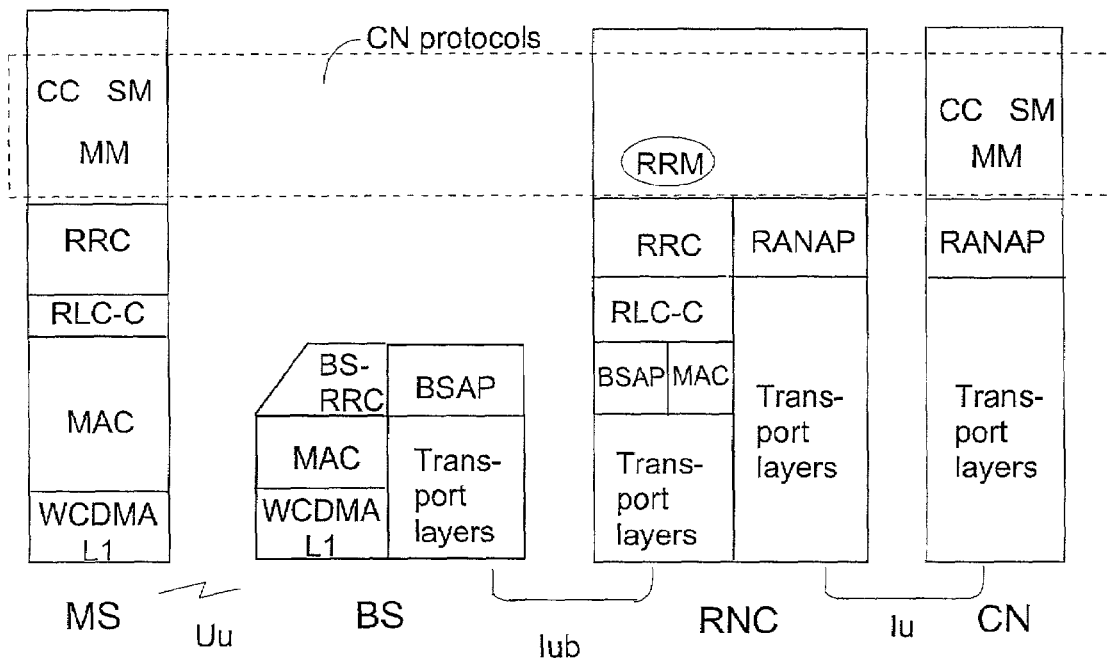
FIGS. 4a and 4b show protocol stacks of the UMTS packet data service for control signalling and transmitting user data.
Figure 4B:
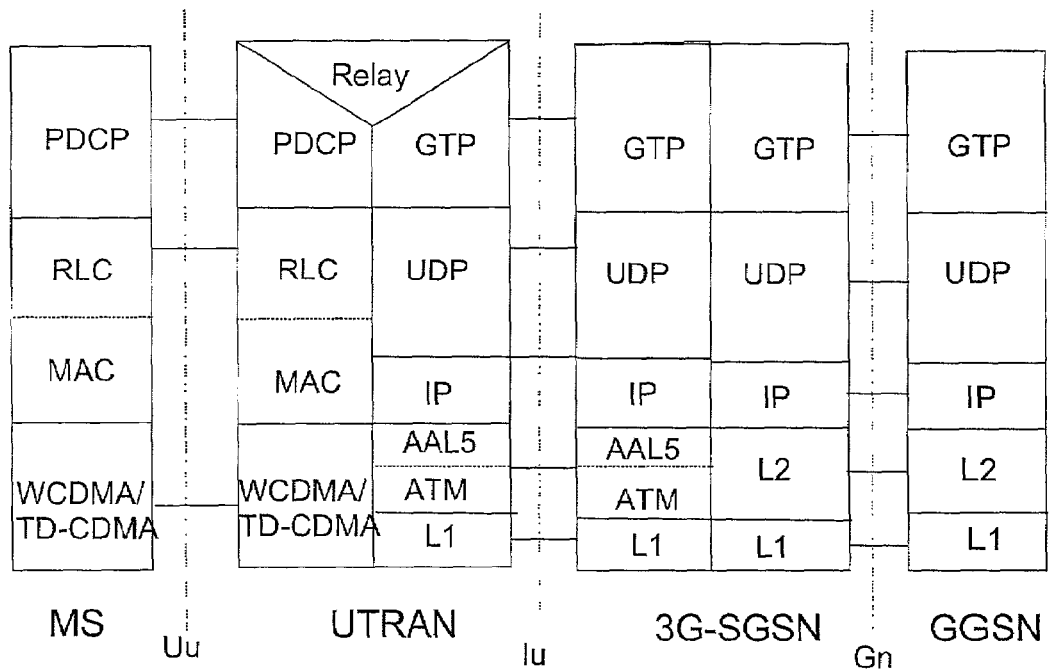

FIGS. 4a and 4b show UMTS protocol stacks used for control signalling (control plane) and user data transmission (user plane) in a packet radio service of the UMTS system. FIG. 4a shows the protocol stack used for control signalling between a mobile station MS and the core network CN. Mobility management MM of the mobile station MS, call control CC and session management SM are signalled on the highest protocol layers between the mobile station MS and the core network CN in such a manner that the base stations BS and the radio network controller RNC located in between are transparent to this signalling. Radio resource management of radio links between mobile stations MS and base stations BS is managed by a radio resource management system RRM which transmits control data from a radio network controller RNC to base stations BS. These functions related to the general management of a mobile system form a group called core network protocols (CN protocols), also known as Non-Access Stratum. Correspondingly, the signalling related to radio network control between a mobile station MS, a base station BS and a radio network controller RNC is done on protocol layers called radio access network protocols (RAN protocols), i.e. Access Stratum These include transfer protocols on the lowest level and the control signalling transmitted by the transfer protocols is transferred to the higher levels for further processing. The most essential of the higher Access Stratum layers is the radio resource control protocol RRC which is responsible for establishing, configuring, maintaining and releasing radio links between the mobile station MS and the radio network UTRAN and for transmitting control information from the core network CN and the radio network RAN to the mobile stations MS. In addition, the radio resource control protocol RRC is responsible for allocating enough capacity for the radio bearer according to the instructions of the radio resource management system RRM in application-based capacity allocation, for instance.

A protocol stack as shown in FIG. 4b is used in transmitting UMTS packet-switched user data. On the interface Uu between the radio network UTRAN and a mobile station MS, the lower-level data transmission on a physical layer is performed according to a WCDMA or TDCDMA protocol. A MAC layer above the physical layer transmits data packets between the physical layer and an RLC layer and the RLC layer handles the logical management of the radio links of different radio bearers. The RLC functions comprise for instance segmenting the user data (RLC-SDU) being transmitted into one or more RLC data packets RLC-PDU. IP header fields in data packets (PDCP-PDU) of a PDCP layer above RLC can optionally be compressed. After this, PDCP-PDUs are forwarded to RLC and they correspond to one RLC-SDU. The user data and the RLC-SDUs are segmented and transmitted in RLC frames, to which address and verification information essential for data transmission is added The RLC layer also takes care of re-transmission of damaged frames. The serving node 3G-SGSN manages the routing of the data packets coming from the mobile station MS through the radio network RAN on to the correct gateway node 3G-GGSN. This connection uses the tunnelling protocol GTP which encapsulates and tunnels all user data and signalling transmitted through the core network. The GTP protocol runs on top of the IP used by the core network.

Figure 5A:
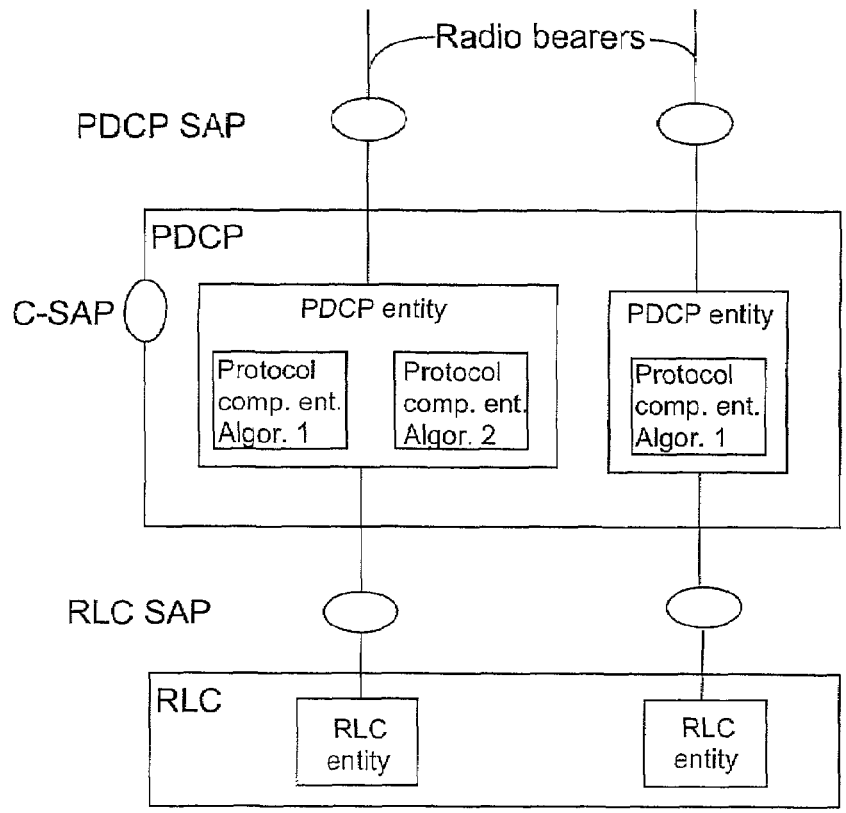
FIGS. 5a and 5b show operational models of the PDCP layer.

FIG. 5a shows an functional model of the PDCP layer, in which one PDCP entity is defined for each radio bearer. Since in the present systems, an individual PDP context is defined for each radio bearer, one PDCP entity is also defined for each PDP context, and a certain RLC entity is defined for each PDCP entity on the RLC layer. As stated above, the PDCP layer can in principle also be functionally implemented in such a manner that several PDP contexts are multiplexed on the PDCP layer, in which case on the RLC layer below the PDCP layer, one RLC entity receives data packets from several radio bearers at the same time.

Figure 5B:
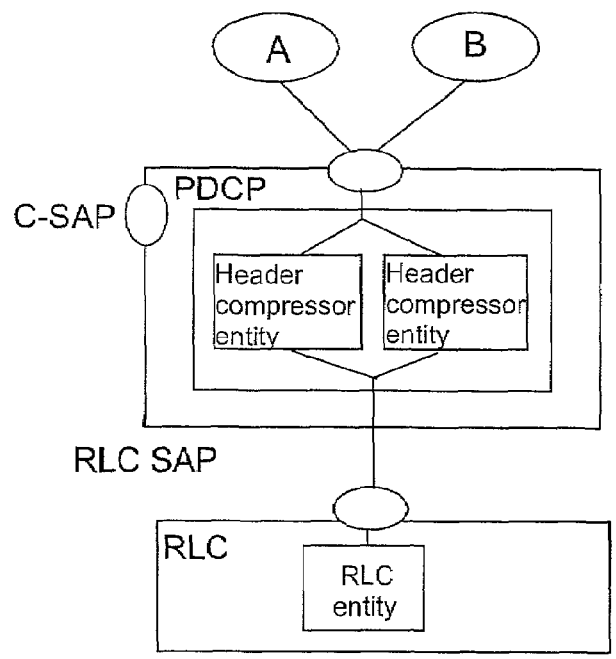

FIG. 5b illustrates a situation, in which a PDCP entity receives data packets through one radio bearer from two different applications, A and B. The data flows in the radio bearer are distinguished from each other on the basis of IP header fields before the header field compressor in the PDCP entity, after which the data flows are taken to be compressed. The compressor distinguishes the data flows from each other by defining them separate context identifiers, by means of which the decompressor of the receiver can again distinguish the data flows from each other and decompress them. To illustrate this, FIG. 5b shows the compressor entity as two separate boxes, but in practice, there are two compression contexts within the same compression entity. The compressed data flows are, however, transmitted over the same RLC connection.

Each PDCP entity can use one or more header field compression algorithms or not use any. Several PDCP entities can also use the same algorithm. The radio resource controller RRC negotiates a suitable algorithm for each PDCP entity as well as parameters controlling the algorithm and then advises the selected algorithm and parameters to the PDCP layer through a PDCP-C-SAP point (PDCP Control Service Access Point). The used compression method depends on the network-level protocol type used on the connection, the type being indicated to the radio resource controller when the PDP context is activated.

In the UMTS system, header field compression of data packets being transmitted and decompression of received data packets are thus done on the convergence protocol layer PDCP. The tasks of the PDCP layer include functions related to improving channel efficiency, which are typically based on different optimization methods, such as utilisation of compression algorithms of data packet header fields. Since today the network-level protocols planned for UMTS are IP protocols, the compression algorithms used are those standardized by IETF (Internet Engineering Task Force). Thus, the ROHC compression method is especially well-suited for the UMTS system. The PDCP layer of the terminal typically supports several header field compression methods so as to allow connection establishment with as many network-level protocol types as possible.

When applying ROHC to the convergence protocol layer of UMTS, both the transmitting PDCP and the receiving PDCP comprise a compressor-decompressor-pair for compressing the data packets being transmitted and decompressing the received data packets. The convergence protocol layer PDCP provides the compression method ROHC a mechanism for negotiating the length of the context identifier for each radio bearer. In practice, the mechanism is implemented in such a manner that the PDCP layer transmits the messages of the compressor and decompressor on to RRC and the actual negotiation is done by RRC signalling. To be able to utilise the radio resources as efficiently as possible, the length of the context identifier CID is preferably defined as zero for the radio bearer.

If the length of the context identifier CID defined for the radio bearer is "small", i.e. zero bytes, and all possible 16 data connections are in use, and if the user of the terminal wants to establish one more simultaneous data flow for a radio bearer having such a definition, a problem situation occurs, since 17 simultaneous data flows cannot be distinguished from each other with a "small" context identifier. Because a new data flow cannot be identified by its own context identifier according to ROHC specifications, a context identifier of an existing data flow will be defined for it. In such a case, two data flows having the same context identifier are transmitted simultaneously, which results in an error situation in the decompressor, because the decompressor can no longer distinguish the data connections from each other. A corresponding problem also arises with any other defined CID length value, when the radio bearer uses the maximum number of data connections defined for the length of the context identifier CID, and the user of the terminal tries to open a new data flow. Transmitting several data flows over a radio interface without header field compression leads to an inoptimal utilisation of radio resources, which is a hindrance to an efficient use of the entire mobile system.

The problems described above can, however, now be reduced with the procedure of the invention, in which the parameters of the radio bearer are defined in such a manner that at least the number of data packet connection header fields allowed by the length of the defined context identifier can be compressed despite the fact that the number of data packet connections allowed by said context identifier length is exceeded. This way, it is possible to ensure that for instance when the length of the radio bearer context identifier is set at zero and the user of the terminal wants to establish a $17^{th}$ simultaneous data flow for the radio bearer, at least the original 16, preferably all 17, data flows can be transmitted using ROHC. Correspondingly, with any other defined CID length value, when the radio bearer uses the maximum number of data connections defined for the length of the context identifier CID, and the user of the terminal tries to open a new data flow, it is possible to ensure that at least a number corresponding to the original number of data connections, preferably all data flows, can be transmitted using ROHC.

According to a first embodiment of the invention, the definition described above can be performed by means of ROHC so that the ROHC algorithm is defined in such a manner that at least one value, preferably the last one, of the length of the context identifier CID, i.e. CID space, negotiated for each radio bearer is always reserved for an uncompressed data flow. Thus, it is possible to ensure that the data connections already in use can be transmitted compressed and, at the same time, a new data connection can be established without compression. The ROHC algorithm can, for instance, be defined on the basis of the negotiation between the compressor and decompressor in such a manner that if the length of the context identifier field is set to zero, the first 15 data flows are compressed, and if the user of the terminal tries to form a new ($16^{th}$) data flow, it and any simultaneous data flows formed after it are transmitted uncompressed to the receiver. A CID field is attached to the uncompressed data packets to inform the receiver that their header fields have not been compressed and they should, thus, be directed past the decompressor. It is also possible to reserve for uncompressed data flows several values of the CID space of the context identifier field negotiated for the radio bearer.

According to a second embodiment of the invention, the convergence protocol layer PDCP monitors the number of data connections and if the number of allowed data connections is exceeded, the PDCP layer informs the radio resources control protocol RRC of this, which then performs radio bearer reconfiguration during which the radio bearer parameters, especially the length of the context identifier, are re-defined so that the header fields of each data flow can be compressed according to ROHC. For instance, if the length of the radio bearer context identifier is set to zero and the PDCP layer detects 17 or more simultaneous data flows, the radio bearer is re-configured, whereby the maximum value of the context identifier field is defined to be larger than zero. This requires that a new functionality is added to the PDCP layer to monitor the number of data connections of each radio bearer. If the number of data connections on a radio bearer corresponds to the maximum value of the context identifier length, and a new data connection is being established, PDCP informs RRC as described above. It is also possible that due to the limited properties of the terminal, for instance, the number of simultaneous data connections is through RRC signalling set to four data flows, for instance It is then necessary that the PDCP layer can monitor the number of simultaneous data connections as described above, because the ROHC mechanisms do not affect a situation in which the highest number of simultaneous data connections is smaller than the maximum value of the context identifier field.

The first and second embodiment described above can, according to a preferred embodiment, be used by means of the PDCP layer in such a manner that the PDCP layer monitors according to said second embodiment the number of data connections on a radio bearer and when necessary defines according to said first embodiment that header field compression is not performed to the extra data connections exceeding the number of data connections allowed by the maximum context identifier value. This ensures that at least the original data flows can be transmitted optimally compressed In such a case, if the length of the context identifier of the radio bearer is defined at zero, for instance, and the PDCP layer detects 17 simultaneous data flows, said last ($17^{th}$) flow is transmitted without header field compression, and said functionality of the PDCP layer directs the new data flow past the compressor. According to a preferred embodiment, said functionality of the PDCP layer can also select the data flows which are compressed, in which case the data flow being directed past the compressor is not automatically the data flow formed last According to a third embodiment, the UMTS entity (e.g. session management protocol SM) which, when a data connection is being established, decides, to which radio bearer the new data flows belong, is, when the data connection is being established, informed of the limitations caused by the maximum value of the context identifier to the number of simultaneous data connections, especially when the length of the radio bearer context identifier is set at zero. If 16 data flows are then in use and a need for 17 or more simultaneous data flows is detected, a new "extra" data flow can be defined its own radio bearer or the first radio bearer is re-configured and the length of the context identifier field is given a larger value than zero. In both cases, the header fields of each data flow can be compressed according to ROHC. In this embodiment, too, one must especially take into consideration a situation, in which, due to the limited properties of the terminal, the highest number of simultaneous data connections is only four data flows, for instance. In such a case, it is necessary that the entity controlling the establishment of the data connection is able to monitor the number of simultaneous data connections as described above.

According to a fourth embodiment, packet identifiers (PID) in the data packet structure of the PDCP layer are used to indicate the changes needed in the length of the context identifier. On the PDCP layer, the different compression methods are indicated and distinguished from each other by means of packet identifiers PID attached to the data packets PDU. For each PDCP entity, a table is created for the values of the packet identifier PID, in which different compression algorithms are matched with different data packets, and the value of the packet identifier PID is determined as a combination of these. If no compression algorithm is used, the packet identifier PID obtains the value zero. PID values are consecutively defined for each compression algorithm and its combination with different data packet types in such a manner that the PID values of each compression algorithm start from n+1, wherein n is the last PID value defined for the previous compression algorithm. The order of compression algorithms is determined in negotiation with the radio resource controller RRC. On the basis of the PID value table, the PDCP entities at both ends of the packet data connection can identify the compression algorithms of data packets being sent and received.

These PID values can, in this embodiment of the invention, be utilised in such a manner that three PID values are allocated for different context identifier field values (0, 1 or 2 bytes) of ROHC according to the table shown in FIG. 6. Alternatively, two PID values can be allocated to represent the CID space values "small" (0 bytes) and "large" (1 or 2 bytes). Then with a "large" CID space value, the CID field extension bits can be used to indicate in more detail whether this concerns an 8- or 16-bit CID field. Now, if the context identifier length of the radio bearer is set at zero and the PDCP layer detects 17 simultaneous data flows, a change in the CID field length can be indicated to the receiving PDCP entity by means of these PID values. The PID values are preferably transmitted until the radio bearer is re-configured or the number of data connections goes back to 16.

According to a fifth embodiment, the length of the CID field is not re-defined, even though the maximum value of the CID space was exceeded, but a separate RLC connection can be established for different data connections. This can be implemented in such a manner that when the maximum value of the CID space is exceeded, each new data connection gets a separate RLC connection whose CID field length is preferably zero. Alternatively, a separate RLC connection, whose CID field length is set to zero, can be defined for each data flow. Further, the data flows can be distributed to two RLC connections in a situation where 32 data flows are in use, in which case the data flows can be distributed to two RLC connections whose CID field lengths can preferably be kept at zero. Then the PDCP layer specifications should be modified to allow one PDCP entity to use several RLC connections simultaneously. For the utilisation of radio resources, this embodiment is optimal, because each simultaneous data flow can be transmitted without a CID field (CID length=0), in which case the payload proportion of the transmitted data can be maximized.

According to a sixth embodiment, simultaneous data connections exceeding the defined maximum value of the context identifier are not accepted for transmission. If the context identifier length of the radio bearer has been set to zero, for instance, and there are 16 data flows in use, and an attempt is made to form a $17^{th}$ simultaneous data flow, the PDCP layer and/or compressor will not accept said 17$^{th}$ data connection for establishment, and its data packets will be rejected.

This way, the procedure of the invention ensures that in all situations it is possible to compress at least as many data connections transmitted on the radio bearer as allowed by the maximum length of the context identifier field defined for the radio bearer. Further, the discontinuation of the compression of data connections which are transmitted compressed is avoided by means of the procedure of the invention. The procedure of the invention enables applying header field compression to data connections in the most efficient manner possible, which is advantageous for an efficient utilisation of radio resources.

The procedure of the invention is above described using the UMTS system as an example. Header field compression according to ROHC is, however, not bound to the UMTS system, but can preferably be applied to any telecommunications system transmitting IP data packets. The procedure of the invention can preferably be applied for instance to further development projects of second-generation mobile systems, such as GERAN (GSM Edge Radio Access Network).

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method of defining header field compression for a data packet connection, the method comprising
    defining a context for a compressor and decompressor as one parameter of the connection for controlling the operation of said compressor and decompressor,
    defining a length for a context identifier used in identifying data packet connections on data transmission between the compressor and decompressor, which length defines the maximum number of compressed data packet connections transmitted on one connection,
    identifying each data packet connection by its own context identifier, and
    defining the parameters of the connection in such a manner that at least the number of header fields of data packet connections allowed by the length of the defined context identifier can be compressed despite the fact that the number of data packet connections allowed by said context identifier length is exceeded.

2. A method as claimed in claim 1, further comprising reserving at least one value of the length of the defined context identifier for an uncompressed data flow.

3. A method as claimed in claim 1, further comprising controlling the compression by a convergence protocol layer of a mobile system, and
    directing the mobile system, in response to exceeding the number of data packet connections allowed by the context identifier length, to re-define the parameters of a radio bearer in such a manner that the new value of the context identifier length enables the compression of the header fields of all data packet connections.

4. A method as claimed in claim 3, further comprising using values defined for data packet identifiers of the convergence protocol layer to define the new value for the context identifier length.

5. A method as claimed in claim 1, further comprising controlling the compression by the convergence protocol layer of the mobile system,
    signalling the maximum number of simultaneous data packet connections defined for each radio bearer to the mobile system entity which, when establishing a new data packet connection, decides which radio bearer it will be associated with, and
    directing the mobile system, in response to exceeding the number of data packet connections allowed by the context identifier length, to re-define the radio bearer parameters in such a manner that the new value of the context identifier length enables the compression of the header fields of all data packet connections.

6. A method as claimed in claim 1, further comprising controlling the compression by the convergence protocol layer of the mobile system,
    signalling the maximum number of simultaneous data packet connections defined for each radio bearer to the mobile system entity which, when establishing a new data packet connection, decides which radio bearer it will be associated with, and
    directing the mobile system, in response to exceeding the number of data packet connections allowed by the maximum value of the context identifier length, to define a new radio bearer for the extra data packet connections.

7. A method as claimed in claim 1, further comprising controlling the compression by the convergence protocol layer of the mobile system,
    directing the convergence protocol layer or the compressor in it, in response to exceeding the number of data packet connections allowed by the maximum value of the context identifier length, to transmit the extra data packet connections without header field compression.

8. A method as claimed in claim 7, further comprising attaching to said extra data packet connections an identifier, on the basis of which the data packets are received without decompression.

9. A method as claimed in claim 1, further comprising controlling the compression by the convergence protocol layer of the mobile system, and
    directing the convergence protocol layer, in response to exceeding the number of data packet connections allowed by the maximum value of the context identifier length, to define for the data packet connections several link-level connections to which the data packet connections are allocated.

10. A method as claimed in claim 1, further comprising controlling the compression by the convergence protocol layer of the mobile system, and
    directing the convergence protocol layer, in response to exceeding the number of data packet connections allowed by the maximum value of the context identifier length, to reject the extra data packet connections.

11. A method as claimed in claim 3, wherein the terminal limits the number of simultaneous data packet connections to be smaller than the number of data packet connections allowed by the maximum value of the context identifier length.

12. A header field compression system comprising
    a compressor and decompressor,
    a context configured to be defined for the data packet connection between the compressor and the decompressor as one parameter of the connection, which context controls the operation of the compressor and the decompressor,
    a context identifier configured to identify the data packet connections, for which a length is configured to be defined for the context identifier, said length defining the maximum number of compressed data packet connections transmitted on one connection between the compressor and decompressor, in which system the data packet connections are configured to be identified by a context identifier, and the parameters of the connection are configured to be defined in such a manner that at least the number of header fields of data packet connections allowed by the defined context identifier length can be compressed despite the fact that the number of data packet connections allowed by said context identifier length is exceeded.

13. A system as claimed in claim 12, wherein at least one value of the length of the defined context identifier is reserved for an uncompressed data flow.

14. A system as claimed in claim 12, wherein the compression is configured to be controlled by a convergence protocol layer of a mobile system, and the mobile system is configured, in response to exceeding the number of data packet connections allowed by the context identifier length, to re-define the parameters of a radio bearer so that the new value of the context identifier length enables the compression of the header fields of all data packet connections.

15. A system as claimed in claim 12, wherein the compression is configured to be controlled by the convergence protocol layer of the mobile system, and the convergence protocol layer is configured, in response to exceeding the number of data packet connections allowed by the maximum value of the context identifier length, to define for the data packet connections several link-level connections to which the data packet connections are allocated.

* * * * *

UNITED STATES PATENT AND TRADEMARK OFFICE
CERTIFICATE OF CORRECTION

| | | |
|---|---|---|
| PATENT NO. | : 7,035,287 B2 | |
| APPLICATION NO. | : 09/978479 | |
| DATED | : April 25, 2006 | |
| INVENTOR(S) | : Ari Tourunen and Juha Kalliokulju | |

It is certified that error appears in the above-identified patent and that said Letters Patent is hereby corrected as shown below:

Column 16:
Please add the following claims:

16. A network element for a mobile communication system comprising a header field compression system including a compressor and a decompressor, the header field compression system comprising means for defining a context for the data packet connection between the compressor and the decompressor as one parameter of the connection, the context controlling the operation of the compressor and decompressor and comprising a context identifier to identify the data packet connections, means for defining a length for the context identifier for data transmission between the compressor and decompressor, the length defining the maximum number of compressed data packet connections transmitted on one connection, means for identifying each data packet connection by its own context identifier, wherein the network element comprises means for receiving a signal from a convergence protocol layer of the mobile communication system, the signal indicating the maximum number of simultaneous data packet connections defined for each radio bearer, and the network element comprises means for directing the mobile communication system, in response to exceeding the number of data packet connections allowed by the maximum value of the context identifier length, to define a new radio bearer for the extra data packet connections.

UNITED STATES PATENT AND TRADEMARK OFFICE
CERTIFICATE OF CORRECTION

| | |
|---|---|
| PATENT NO. | : 7,035,287 B2 |
| APPLICATION NO. | : 09/978479 |
| DATED | : April 25, 2006 |
| INVENTOR(S) | : Ari Tourunen and Juha Kalliokulju |

It is certified that error appears in the above-identified patent and that said Letters Patent is hereby corrected as shown below:

17. A network element according to claim 16, wherein the network element is configured to reserve at least one value of the length of the defined context identifier for an uncompressed data flow.

18. A mobile device for a mobile communication system comprising a header field compression system including a compressor and a decompressor, the header field compression system comprising means for defining a context for the data packet connection between the compressor and the decompressor as one parameter of the connection, the context controlling the operation of the compressor and decompressor and comprising a context identifier to identify the data packet connections, means for defining a length for the context identifier for data transmission between the compressor and decompressor, the length defining the maximum number of compressed data packet connections transmitted on one connection,
means for identifying each data packet connection by its own context identifier, wherein the mobile device comprises means for signalling, on its convergence protocol layer, the maximum number of simultaneous data packet connections defined for each of its radio bearers to a mobile communication system entity which, when establishing a new data packet connection, decides which radio bearer it will be associated with, and the mobile device comprises means for receiving a command from the entity, in response to exceeding the number of data packet connections allowed by the maximum value of the

UNITED STATES PATENT AND TRADEMARK OFFICE
CERTIFICATE OF CORRECTION

| | |
|---|---|
| PATENT NO. | : 7,035,287 B2 |
| APPLICATION NO. | : 09/978479 |
| DATED | : April 25, 2006 |
| INVENTOR(S) | : Ari Tourunen and Juha Kalliokulju |

It is certified that error appears in the above-identified patent and that said Letters Patent is hereby corrected as shown below:

context identifier length, to define a new radio bearer for the extra data packet connections.

19. A mobile device according to claim 18, wherein the mobile device is configured to reserve at least one value of the length of the defined context identifier for an uncompressed data flow.

20. A network element for a mobile communication system comprising a header field compression system including a compressor and a decompressor, the header field compression system being configured to define a context for the data packet connection between the compressor and the decompressor as one parameter of the connection, the context controlling the operation of the compressor and decompressor and comprising a context identifier to identify the data packet connections,
define a length for the context identifier for data transmission between the compressor and decompressor, the length defining the maximum number of compressed data packet connections transmitted on one connection, identify each data packet connection by its own context identifier, wherein the network element is configured to direct a convergence protocol layer of the mobile communication system, or the compressor in it, in response to exceeding the number of data packet connections allowed by the maximum value of the context identifier length, to transmit the extra data packet connections without header field compression.

UNITED STATES PATENT AND TRADEMARK OFFICE
CERTIFICATE OF CORRECTION

| | |
|---|---|
| PATENT NO. | : 7,035,287 B2 |
| APPLICATION NO. | : 09/978479 |
| DATED | : April 25, 2006 |
| INVENTOR(S) | : Ari Tourunen and Juha Kalliokulju |

It is certified that error appears in the above-identified patent and that said Letters Patent is hereby corrected as shown below:

21. A network element according to claim 20, wherein the network element is configured to reserve at least one value of the length of the defined context identifier for an uncompressed data flow.

22. A mobile device for a mobile communication system comprising a header field compression system including a compressor and a decompressor, the header field compression system being configured to define a context for the data packet connection between the compressor and the decompressor as one parameter of the connection, the context controlling the operation of the compressor and decompressor and comprising a context identifier to identify the data packet connections, define a length for the context identifier for data transmission between the compressor and decompressor, the length defining the maximum number of compressed data packet connections transmitted on one connection, identify each data packet connection by its own context identifier, wherein the mobile device is configured to receive a command from a mobile communication system entity which, when establishing a new data packet connection, decides which radio bearer it will be associated with, to transmit the extra data packet connections without header field compression, in response to exceeding the number of data packet connections allowed by the maximum value of the context identifier length.

UNITED STATES PATENT AND TRADEMARK OFFICE
CERTIFICATE OF CORRECTION

| | | |
|---|---|---|
| PATENT NO. | : 7,035,287 B2 | |
| APPLICATION NO. | : 09/978479 | |
| DATED | : April 25, 2006 | |
| INVENTOR(S) | : Ari Tourunen and Juha Kalliokulju | |

It is certified that error appears in the above-identified patent and that said Letters Patent is hereby corrected as shown below:

23. A mobile device according to claim 22, wherein the mobile device is configured to reserve at least one value of the length of the defined context identifier for an uncompressed data flow.

Signed and Sealed this

Thirteenth Day of May, 2008

JON W. DUDAS
*Director of the United States Patent and Trademark Office*